United States Patent
Lessard

(10) Patent No.: US 10,799,876 B2
(45) Date of Patent: Oct. 13, 2020

(54) DRIVE FOR A VERTICAL STIRRED MILL

(71) Applicant: Compagnie Engrenages et Reducteurs—Messian—Durand, Cambrai (FR)

(72) Inventor: Fabrice Lessard, Cambrai (FR)

(73) Assignee: COMPAGNIE ENGRENAGES ET REDUCTEURS-MESSIAN-DURAND, Cambrai (FR)

( * ) Notice: Subject to any disclaimer, the term of this patent is extended or adjusted under 35 U.S.C. 154(b) by 387 days.

(21) Appl. No.: 15/558,317

(22) PCT Filed: Mar. 17, 2016

(86) PCT No.: PCT/EP2016/055859
§ 371 (c)(1),
(2) Date: Sep. 14, 2017

(87) PCT Pub. No.: WO2016/146774
PCT Pub. Date: Sep. 22, 2016

(65) Prior Publication Data
US 2018/0056303 A1    Mar. 1, 2018

(30) Foreign Application Priority Data

Mar. 17, 2015    (FR) ...................... 15 52179

(51) Int. Cl.
*B02C 17/24*     (2006.01)
*F16H 57/023*    (2012.01)
*B02C 17/16*     (2006.01)

(52) U.S. Cl.
CPC ............ *B02C 17/24* (2013.01); *B02C 17/163* (2013.01); *F16H 57/023* (2013.01)

(58) Field of Classification Search
CPC ....... B02C 19/22; B02C 17/16; B02C 17/163; B02C 19/0025; B02C 17/24; B02C 17/181; F16H 57/023; F16H 57/082
See application file for complete search history.

(56) References Cited

U.S. PATENT DOCUMENTS 3,432,109 A * 3/1969 Geissel .................. B01F 7/245
                                                                241/172
4,013,235 A    3/1977 Halloran, Jr.
(Continued)

FOREIGN PATENT DOCUMENTS

CN    1534213 A    10/2004
CN    1579635 A    2/2005
(Continued)

OTHER PUBLICATIONS

Machine Trainslation of CN-102717291-A from Espacenet, Hou et al., Publication Year 2012, Total pp. 5 (Year: 2019).*
(Continued)

*Primary Examiner* — Teresa M Ekiert
*Assistant Examiner* — Sarkis A Aktavoukian
(74) *Attorney, Agent, or Firm* — Soquel Group LLC

(57) ABSTRACT

A drive device for a vertical stirred mill, including a main housing, a motor, and an element able to be rotated by the motor around a vertical axis, the rotary element being fastened to a rotary milling tool of the vertical stirred mill, the rotary element including a substantially horizontal rotary plate, and the main housing including an axial stop able to guide the rotary element axially, the rotary plate being arranged bearing on the axial stop, the axial stop thus being able to react to the axial forces exerted on the milling tool during operation of the vertical stirred mill.

8 Claims, 3 Drawing Sheets

(56) References Cited

U.S. PATENT DOCUMENTS

| | | | | |
|---|---|---|---|---|
| 4,813,623 A | * | 3/1989 | Inoue | B02C 17/16 |
| | | | | 241/171 |
| 5,934,581 A | * | 8/1999 | Chiappa | A23G 1/10 |
| | | | | 241/170 |
| 2009/0261190 A1 | * | 10/2009 | Hoffmann | B02C 15/006 |
| | | | | 241/63 |
| 2014/0203128 A1 | * | 7/2014 | Enders | B02C 17/18 |
| | | | | 241/176 |

FOREIGN PATENT DOCUMENTS

| | | | |
|---|---|---|---|
| CN | 201179567 Y | * | 1/2009 |
| CN | 201236923 Y | | 5/2009 |
| CN | 201871399 U | | 6/2011 |
| CN | 102717291 A | * | 10/2012 |
| CN | 103785863 A | * | 5/2014 |
| CN | 203577900 U | | 5/2014 |
| DE | 32 26 816 A1 | | 1/1984 |
| DE | 9314445 U1 | | 2/1994 |
| DE | 199 17 609 A1 | | 11/2000 |
| EP | 1 757 839 A1 | | 2/2007 |

OTHER PUBLICATIONS

French Patent Application No. 15 52179, Rapport de Recherche Preliminaire, dated Jan. 14, 2016, 3 pages.
PCT Application No. PCT/EP2016/055859, International Search Report, dated May 19, 2016, 4 pages.

\* cited by examiner

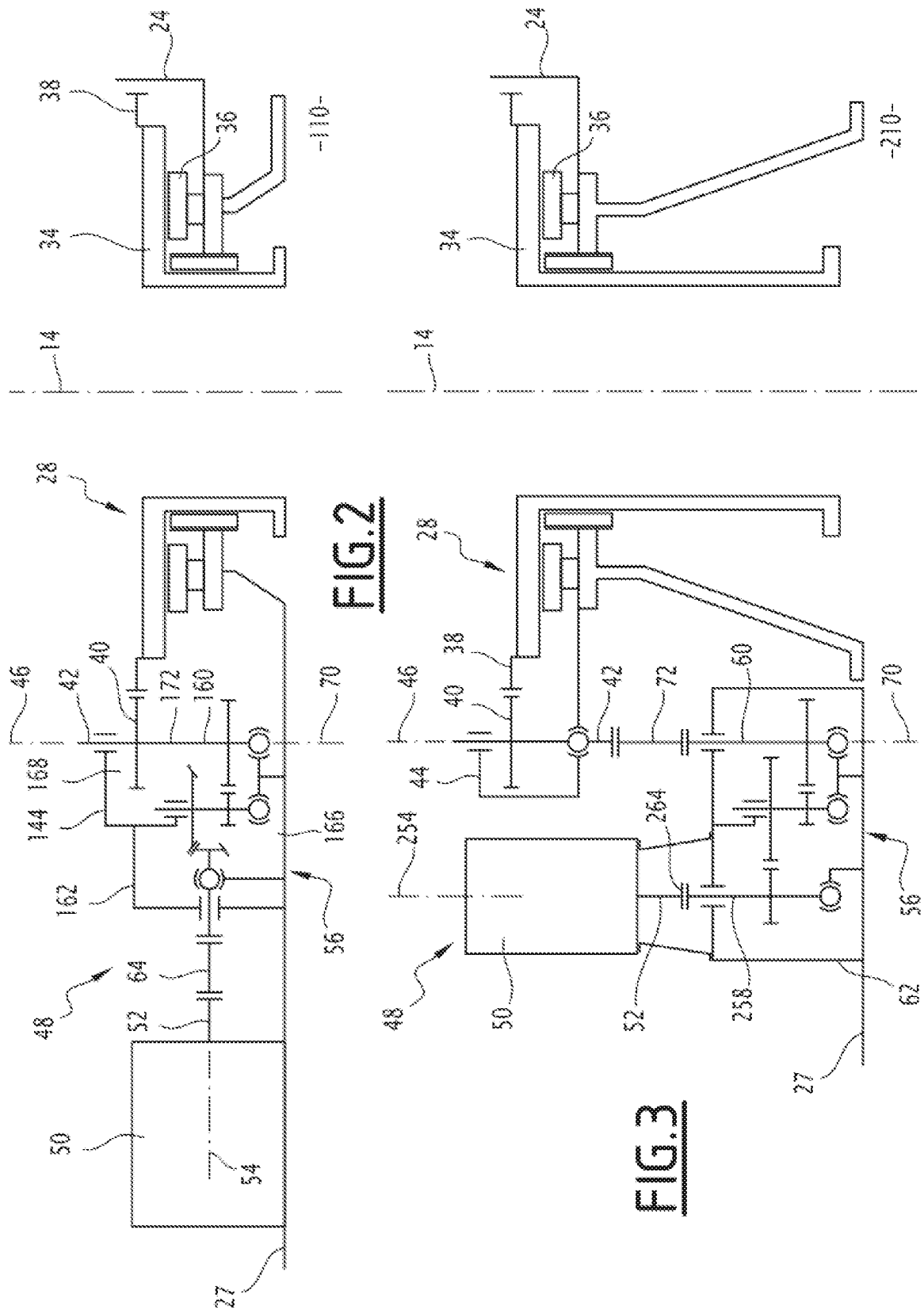

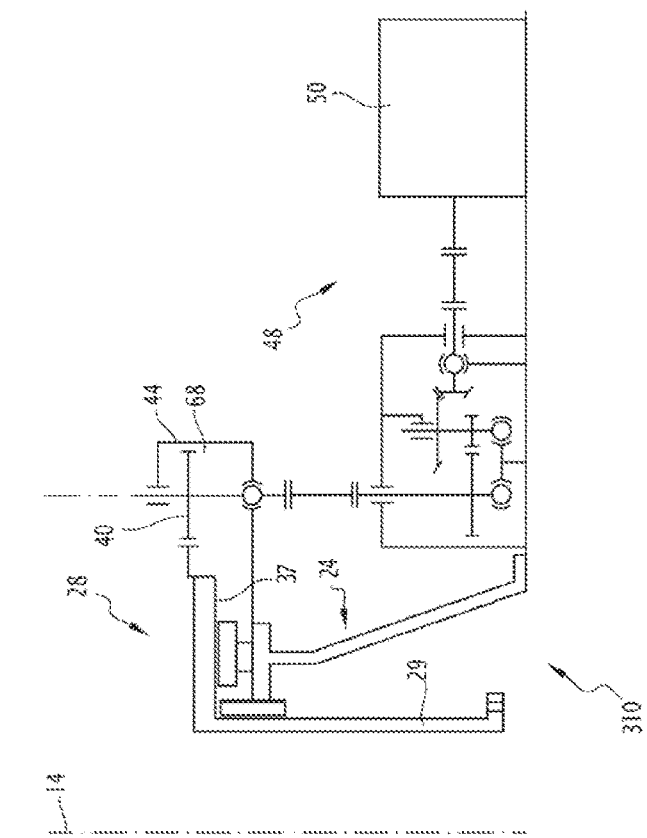
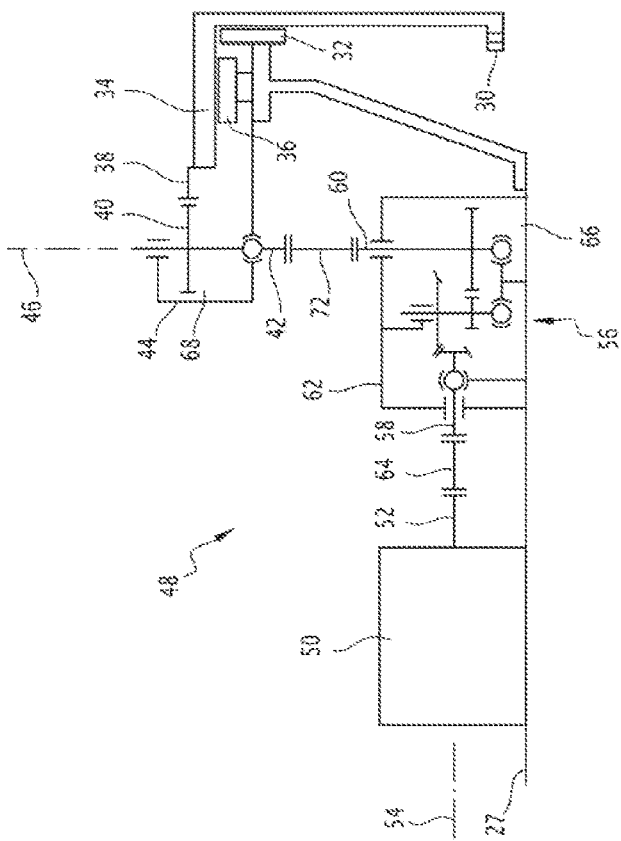
FIG. 4

DRIVE FOR A VERTICAL STIRRED MILL

The present invention relates to a drive device for a vertical stirred mill.

More specifically, the invention relates to a drive device of the type including a main housing, a motor and an element rotating relative to the main housing, around the first vertical axis, the rotary element being able to be rotated by the motor. The rotary element is fastened or able to be fastened to a rotary milling tool of the vertical stirred mill.

Vertical stirred mills are used in the mining industry to mill raw materials. The milling tool, such as a helical blade, is rotatable inside a milling vat.

At this time, the solution used for very high-power driving implements a motor assembly with a vertical axis, mounted on a planet reduction gear and situated above the milling tool. The milling tool is axially supported outside the reduction gear, the latter only reacting to the rotational forces.

Such a mill has a very substantial vertical bulk. It must consequently be housed in a tall building and substantial means must be provided for its installation. The vertical bulk also complicates the maintenance operations and increases the cost.

The present invention aims to propose a driving device for a vertical mill, allowing a minimal vertical bulk for a high power, in particular greater than 746 kW (1000 HP). Furthermore, the device must be cost-effective regarding its production and upkeep.

To that end, the invention relates to a drive device of the aforementioned type, in which the rotary element includes a rotary plate substantially perpendicular to the first axis, and the main housing comprises an axial stop able to guide the rotary element axially and limit a downward axial movement of said rotary element. The rotary plate is arranged bearing on the axial stop, said axial stop thus being able to react to the axial forces exerted on the rotary milling tool during operation of the vertical stirred mill.

According to other aspects of the invention, the drive device includes one or more of the following features, considered alone or according to any technically possible combination(s):

- the axial stop of the main housing is chosen from among an axial bearing, in particular hydrostatic or hydrodynamic, and a stop with rolling elements;
- the main housing comprises a radial bearing able to guide the rotary element radially and react to the radial forces exerted on the rotary milling tool during operation of the vertical stirred mill;
- the rotary element further includes a cylindrical part arranged along the first axis, an upper end of said cylindrical part being secured to the rotary plate, a lower end of said cylindrical part being secured or able to be secured to the rotary milling tool of the vertical stirred mill;
- the rotary element includes an output crown gear and the drive device further includes: at least one drive pinion meshing or able to mesh with the output crown gear, the or each drive pinion being rotatable around the second axis; and at least one drive unit, each drive unit being suitable for rotating a drive pinion, the or each drive unit comprising a motor and an output shaft rotatable around third axis;
- the drive device comprises, for each drive pinion, a secondary housing fastened to the main housing, such that the first and second axes are positioned fixedly relative to one another;
- the or each drive pinion is connected to the output shaft of the drive unit associated with this drive pinion by a coupling device such that the second and third axes are substantially aligned, the coupling device having at least one degree of freedom allowing a misalignment between the second and third axes during the transmission of the rotation from the output shaft to the drive pinion;
- the coupling device includes a disengagement system to reversibly uncouple the drive pinion and the output shaft from the drive unit;
- the or each drive pinion includes a pinion shaft mounted fixed relative to the output shaft of the associated drive unit;
- the drive device comprises several drive pinions, each pinion being associated with a drive unit, said drive pinions and drive units being distributed angularly around the first axis.

The invention further relates to a vertical mill comprising a rotary milling tool rotating relative to a milling vat along a vertical axis, the rotary milling tool being arranged in the milling vat, said mill comprising a drive device as described above, the rotary element of the drive device being fastened to an upper end of the rotary milling tool and the main housing of the drive device being fastened to the milling vat and arranged above said vat. Preferably, the rotary milling tool is suspended from the rotary element such that the weight of said rotary milling tool is completely reacted by said rotary element.

The invention will be better understood upon reading the following description, provided solely as a non-limiting example and done in reference to the drawings, in which:

FIG. 2 is a schematic sectional view of a stirred mill comprising a drive device according to a second embodiment of the invention;

FIG. 3 is a schematic sectional view of a stirred mill comprising a drive device according to a third embodiment of the invention; and FIG. 4 is a schematic sectional view of a stirred mill comprising a drive device according to a fourth embodiment of the invention.

Figure 1:
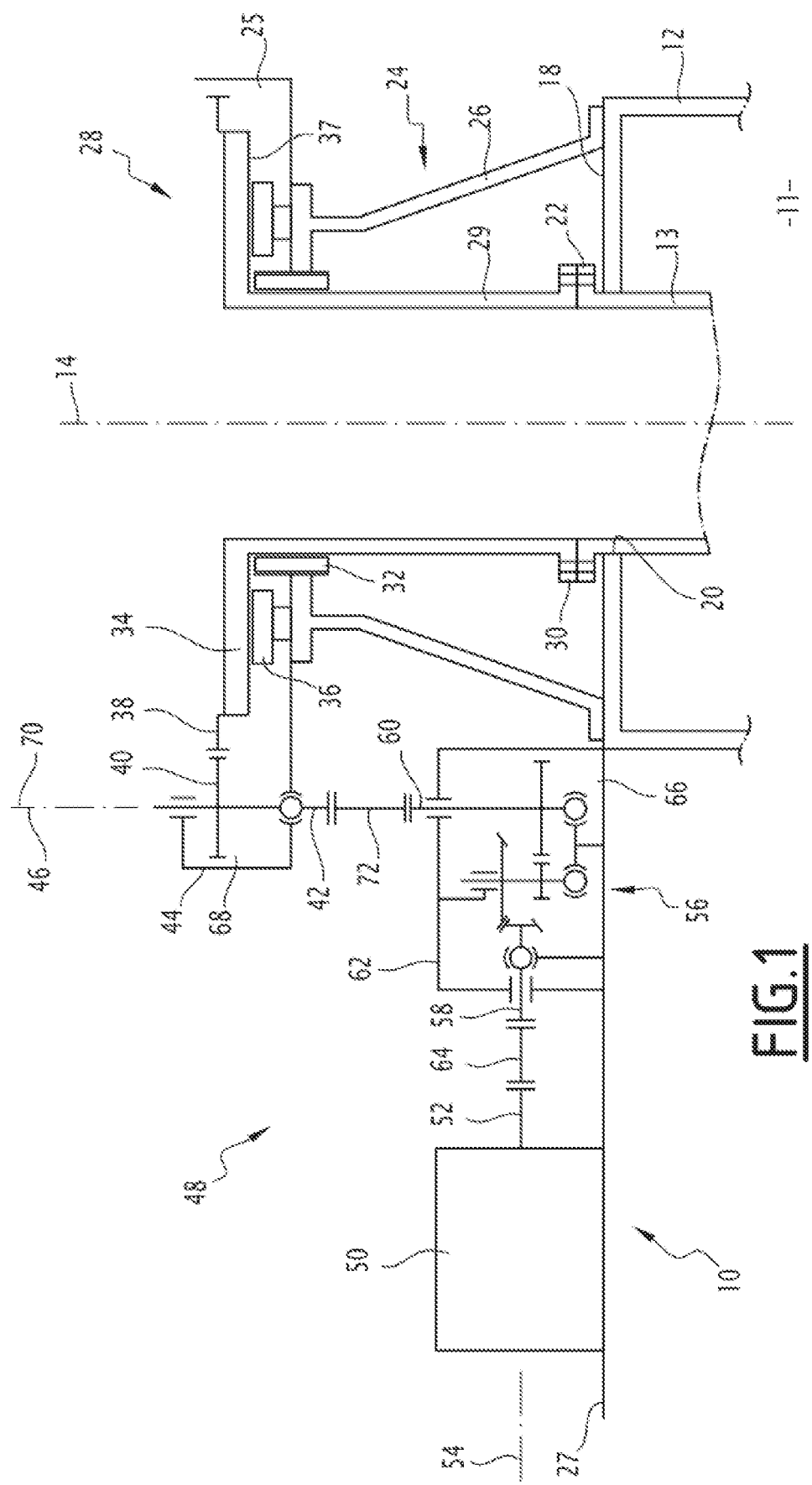
FIG. 1 is a schematic sectional view of a stirred mill comprising a drive device according to a first embodiment of the invention.

The drive device 10, shown in FIG. 1, the drive device 110, shown in FIG. 2, the drive device 210, shown in FIG. 3, and the drive device 310, shown in FIG. 4, are intended to be part of a vertical stirred mill 11 partially shown in FIG. 1.

The mill 11 includes a milling vat 12, as well as a milling tool 13 rotatable relative to the milling vat 12 along a first vertical axis 14.

The rotary milling tool 13 is arranged inside the milling vat 12. The milling tool for example includes a helical blade, or a set of milling disks stacked along the first axis 14, or milling fingers perpendicular to the first axis 14.

An upper wall 18 of the milling vat 12 includes an orifice 20, coaxial to a first axis 14. The milling tool 13 passes through said orifice 20, an upper end 22 of said milling tool 13 forming a protrusion above the upper wall 18. The upper end 22 is for example in the form of a fastening flange.

The upper end 22 of the rotary milling tool 13 is connected to the drive device 10, 110, 210, 310. In the following description, the elements shared by the drive devices 10, 110, 210 and 310 are designated by the same reference numbers.

The drive device 10, 110, 210, 310 comprises a main housing 24, preferably having a shape of revolution relative to the first axis 14.

The main housing 24 includes an upper part 25, preferably cylindrical. The main housing 24 further includes a lower support 26, intended to react the dynamic forces of the drive device 10, 110, 210, 310. The lower support 26 for example comprises a cylindrical or frustoconical wall and a base plate, or uprights. Preferably, the upper part 25 and the lower support 26 are formed in one piece.

The lower support 26 is placed on a foundation 27, for example made up of or secured to the upper wall 18 of the milling vat 12.

The drive device 10, 110, 210, 310 further comprises a rotary element 28, rotatable around the first axis 14 relative to the main housing 24.

In the embodiments of FIGS. 1 to 3, the rotary element 28 comprises a cylindrical part 29, able to be fixedly assembled to the upper end 22 of the rotary milling tool 13. The cylindrical part 29 is arranged along the first axis 14. A lower end 30 of the cylindrical part 29 is for example in the form of a fastening flange and is fastened to the upper end 22 of the rotary milling tool 13, for example using bolts.

Preferably, the rotary milling tool 13 is assembled to the rotary element 28, such that the weight of said rotary milling tool 13 is reacted by said rotary element 28.

In particular, a lower end (not shown) of the rotary milling tool 13 is preferably situated at a distance from the walls of the milling vat 12, not supported by said walls. The milling tool 13 is therefore suspended from the drive device 10, 110, 210, 310 the weight of said milling tool 13 being completely reacted by said drive device 10, 110, 210, 310.

The cylindrical part 29 is guided in rotation by a radial bearing 32, secured to the lower support 26 of the main housing 24. The radial bearing 32 is for example a radial rolling bearing.

The rotary element 28 further comprises a rotary plate 34 substantially in the form of a ring arranged in a horizontal plane. The rotary plate 34 extends radially outward from an upper end of the cylindrical part 29. The rotary plate 34 is arranged in the upper part 25 of the main housing 24.

The drive device 10, 110, 210, 310 also comprises an axial stop 36 arranged in contact with a lower wall 37 of the rotary plate 34. The axial stop 36 is secured to the main housing 24.

The axial stop 36 is able to guide the rotary element 28 axially along the first axis 14. Furthermore, the axial stop 36 limits a downward axial movement of said rotary element 28.

The rotary plate 34 bears on the axial stop 36. Thus, the weight of the rotary milling tool 13 is completely reacted by the axial stop 36 via the rotary plate 34, and transmitted to the main housing 24. Likewise, all of the axial forces generated by the milling process are reacted by the axial stop 36.

Furthermore, all of the radial forces generated by the milling process are reacted by the radial bearing 32 and transmitted to the main housing 24.

Preferably, for very high-power mills, the axial stop 36 is a bearing with hydrostatic pads or a bearing with hydrodynamic pads. These bearings can withstand very substantial forces.

Alternatively, the axial stop 36 is a stop with rolling elements, for example rollers or beads.

The drive device 10, 110, 210, 310 also comprises an output crown gear 38, secured to a periphery of the rotary plate 34. The output crown gear 38 is arranged in the upper part 25 of the main housing 24. Preferably, the crown gear 38 has outer teeth, as shown in FIGS. 1, 2 and 3. According to an alternative embodiment, the crown gear has inner teeth. The crown gear 38 preferably has helical teeth; alternatively, the crown gear 38 has straight teeth.

The drive device 10, 110, 210, 310 also comprises a drive pinion 40. The drive pinion 40 is fastened on a pinion shaft 42, preferably with no degree of freedom. In particular, the drive pinion 40 is not mounted freely tilting on the pinion shaft 42.

The or each drive pinion 40 is able to mesh with the crown gear 38. Preferably, the device 10, 110, 210, 310 comprises several drive pinions 40. For example, the drive device 10, 110, 210, 310 comprises between two and twelve drive pinions 40 distributed around the first axis 14. Preferably, the drive pinions 40 are regularly angularly distributed around the output crown gear 38.

The output crown gear 38 and the rotary plate 34 are mounted fixed relative to the main housing 24 along radial directions relative to the first axis 14. In other words, in particular during operation, the output crown gear 38 and the rotary plate 34 are prevented from moving radially relative to the axis 14.

Likewise, the output crown gear 38 and the rotary plate 34 are fixed in rotation perpendicular to the first axis 14. In other words, in particular during operation, the output crown gear 38 and the rotary plate 34 are prevented from tilting around a rotation center arranged on the first axis 14. The only degree of freedom of the output crown gear 38 and the rotary plate 34 is therefore in rotation around the first axis 14.

The drive pinion 40, or each drive pinion 40, is housed in a secondary housing or case 44, 144. The or each drive pinion 40 is rotatable in its secondary housing 44, 144 relative to a second axis 46.

The secondary housing 44, 144 is secured to the main housing 24, and more particularly the upper part 25. Thus, the second rotation axis 46 of the drive pinion 40 is positioned fixedly relative to the first rotation axis 14 of the crown gear 38.

According to one preferred embodiment, the drive pinion 40 is housed fixedly in the secondary housing 44, 144, guided only via rolling bearings, without needing to adjust its radial position relative to its rotation axis 46.

According to one preferred embodiment, the drive pinion 40, or each drive pinion 40, is mounted fixedly relative to the secondary housing 44, 144 along radial directions relative to the second axis 46. In other words, in particular during operation, the drive pinion 40, or each drive pinion 40, is prevented from moving radially relative to the second axis 46.

Likewise, according to one preferred embodiment, the drive pinion 40, or each drive pinion 40, is fixed in rotation perpendicular to the second axis 46. In other words, in particular during operation, the drive pinion 40, or each drive pinion 40, is prevented from tilting around a rotation center arranged on the second axis 46. The only degree of freedom of the drive pinion 40, or each drive pinion 40, relative to the associated secondary housing 44, 144, is therefore in rotation around the second axis 46.

In the embodiments of FIGS. 1 to 3, the secondary housing 44, 144 is permanently fastened to the main housing 24, or the secondary housing 44, 144 is in a single piece with the main housing 24. Alternatively, the secondary housing is removably fastened to the main housing, so as to be able to be disassembled.

The drive pinion 40, or each drive pinion 40, is associated with a drive unit 48 able to rotate said drive pinion. Preferably, the drive unit 48 is fastened to the foundation 27.

The drive unit 48 comprises a rotary motor 50 having a motor shaft 52. In the embodiment of FIGS. 1 and 2, the rotation axis 54 of the motor shaft 52 is horizontal, or perpendicular to the second rotation axis 46 of the drive pinion 40. In the embodiment of FIG. 3, the rotation axis 254 of the motor shaft 52 is vertical, or parallel to the second rotation axis 46 of the drive pinion 40.

The drive unit 48 comprises a reduction gear 56. The reduction gear 56 comprises an input shaft 58, 258, an output shaft 60, 160 and a reduction gear housing 62, 162.

The input shaft 58, 258 and the output shaft 60, 160 are mounted rotating on the reduction gear housing 62, 162. The input shaft 58, 258 and the output shaft 60, 160 have no degree of freedom relative to the reduction gear housing 62, 162, in particular during operation.

The input shaft 58, 258 is connected to the motor shaft 52 by a first coupling 64, 264, with no intermediate reduction stage. In the embodiment of FIGS. 1 and 2, the input shaft 58 of the reduction gear 56 is arranged horizontally. In the embodiment of FIG. 3, the input shaft 258 of the reduction gear 56 is arranged vertically.

In the embodiment of FIG. 3, the input shaft 258 is oriented upward and the motor 50 is positioned above the reduction gear 56. Alternatively, the input shaft is oriented downward and the motor is positioned below the reduction gear.

In the embodiment of FIG. 2, the reduction gear housing 162 is secured to the main housing 24 and the secondary housing 144. For example, the reduction gear housing 162 is permanently fastened to the main housing 24 and/or the secondary housing 144.

In particular, in the embodiment of FIG. 2, inner areas 166, 168 of the reduction gear housing 162 and the secondary housing 144 communicate with one another.

On the contrary, in the embodiments of FIGS. 1 and 3, the reduction gear housing 62 and the secondary housing 44 respectively define inner volumes 66, 68, separate and separated from one another.

The output shaft 60, 160 of the reduction gear 56 is arranged along a third vertical rotation axis 70. Preferably, as shown in FIGS. 1 to 3, the output shaft 60, 160 is positioned below the drive pinion 40.

The output shaft 60, 160 is connected to the pinion shaft 42 so as to rotate the drive pinion 40.

In the embodiment of FIG. 2, the pinion shaft 42 of the drive pinion 40 is stationary relative to the output shaft 160. For example, the pinion shaft 42 and the output shaft 160 are formed in one piece. Thus, the second axis 46 and the third axis 70 are combined.

Furthermore, a junction 172 between the output shaft 160 and the pinion shaft 42 is contained in the inner volume 166, 168 defined by the reduction gear housing 162 and the secondary housing 144.

In the embodiments of FIGS. 1 and 3, the drive pinion 40, and more particularly the pinion shaft 42, is connected to the output shaft 60 by a second coupling 72. This second coupling 72 transmits a rotation of the output shaft 60 to the pinion shaft 42 and therefore to the drive pinion 40. The output shaft 60 is connected to the pinion shaft 42 by the second coupling 72, with no intermediate reduction stage.

The second coupling 72 is configured such that the second axis 46 and the third axis 70 are substantially aligned. The second coupling 72 has at least one degree of freedom allowing a radial and/or angular misalignment between the second axis 46 and the third axis 70 during the rotation.

According to one preferred alternative, the maximal radial misalignment between the second axis 46 and the third axis 70 accepted by the second coupling 72, during the transmission of the rotation from the output shaft 60 to the drive pinion 40, is at least 0.1 mm, more preferably at least 0.5 mm, still more preferably at least 1 mm.

According to another preferred alternative, the maximal angular misalignment between the second axis 46 and the third axis 70 accepted by the second coupling 72, during the transmission of the rotation from the output shaft 60 to the drive pinion 40, is at least 0.1°, more preferably at least 0.5°, still more preferably at least 1°.

A coupling usable as second coupling 72 and allowing the misalignment required by the device 10, 210 is known as such from the state of the art. It is for example a universal joint, a spring coupling, a coupling with teeth or an elastic coupling comprising springs or an elastic rubber coupling.

Preferably, the second coupling 72 is situated outside the inner volumes 66, 68 defined on the one hand by the reduction gear housing 62 and on the other hand by the secondary housing 44. Thus, the second coupling 72 is easily accessible for assembly or upkeep operations.

Preferably, the second coupling 72 is provided with means for adjusting its stiffness in torsion. The second coupling 72 is for example a coupling, in particular with teeth, equipped with a first torsion shaft, the stiffness in torsion of which is lower than the stiffness in torsion of the pinion shaft 42 and the output shaft 60. Thus, the dynamic behavior of the connection between the output shaft 60 and the pinion shaft 42 is influenced by the torsion shaft.

Furthermore, the first torsion shaft can be exchanged for a second torsion shaft, the stiffness in torsion of which is different from that of the first torsion shaft. The section and length of each torsion shaft are therefore chosen and adjusted to modify its stiffness.

Preferably, the second coupling 72 is able to break in case of application of a torque with a torsion exceeding a predetermined threshold, between the output shaft 60 and the pinion shaft 42 or the drive pinion 40. According to one alternative, the second coupling 72 is equipped with means for measuring the torsion torque between the shaft 60 and the drive pinion 40. These means for measuring the torsion torque for example comprise strain gauges.

Preferably, the second coupling 72 is equipped with a disengagement system. Thus, the drive pinion 40 can be reversibly uncoupled from the output shaft 60.

In the examples of FIGS. 1 to 3, each drive unit 48 is associated with a single drive pinion 40 and each reduction gear 32 includes a single output shaft 60, 160. According to one alternative that is not shown, a reduction gear 32 makes it possible to divide the torque of the motor 50; more specifically, the reduction gear 32 includes an input shaft and at least two output shafts, rotatable along axes that are preferably vertical. A drive unit 48 comprising such a reduction gear 32 can thus rotate at least two drive pinions 40.

The power of the drive device 10, 110, 210, 310 in particular depends on the number of drive pinion 40/drive unit 48 assemblies. By increasing this number, it is possible to obtain a high power, in particular greater than 746 kW (1000 HP), by using moderately sized motors 50, without significantly increasing the bulk of the drive device 10, 110, 210, 310.

An operating method of the drive device 10 and the vertical stirred mill 11 of FIG. 1 will now be described. The motor(s) 50 are started, which rotates the output shaft(s) 60 of the or each drive unit 48. The or each output shaft 60 rotates a drive pinion 40. Said drive pinion 40 meshes with the crown gear 38, rotating the rotary plate 34 along the first axis 14.

The rotary milling unit 13, secured to the rotary plate 34, is thus rotated around the axis 14. The rotational driving of the milling tool 13 in the vat 12 allows stirred milling operations.

The drive device 10 makes it possible to react all of the forces acting on the milling tool 13, by the axial stop 36, and optionally by the radial bearing 32. In particular, all of the milling forces, during milling at a nominal power of the mill 11, are reacted by the axial stop 36 and optionally by the radial bearing 32.

The structure of the drive device 10 and the mill 11 described above makes it possible to react very substantial milling forces for given dimensions.

When the device 10 comprises several drive pinion 40/drive unit 48 assemblies, the various motors 50 can be started up one after another in order to gradually increase the power provided to the crown gear 38 upon start up.

When the second couplings 72 are disengageable, it is possible to deactivate certain drive units 48 when the operation of the mill 11 requires low power. It is thus possible to decrease the number of motors 50 in use, in order to operate these motors in a power range for which their energy efficiency is optimal.

A second disengageable coupling 72 also facilitates maintenance operations on the drive pinion 40 and/or on the drive unit 48.

When the second coupling 72 is provided with means for adjusting its stiffness in torsion, it is possible to adjust its stiffness to modify the torsion modes depending on the kinematic chain, the motor and the mill. These modifications can be done upstream from production or a posteriori after commissioning of the equipment.

When the second coupling 72 is able to break in case of application of a torque with a torsion exceeding a predetermined threshold, the second coupling 72 serves as a "fuse" by preventing another part, more expensive or more difficult to change, from breaking.

The devices 110, 210, 310 described above can be used in place of the device 10 to be integrated into the stirred mill 11.

The devices 10 and 210 of FIGS. 1 and 3 in particular have the following advantages. The second coupling 72 reacts the alignment flaws between the drive pinion 40 and the output shaft 60. The assembly and production of the reduction gear 56 can therefore take place with large allowances. Furthermore, a large number of drive pinions 40 can be mounted on the main housing 24 in a determined position, without requiring tedious adjustments to the position of the drive units 48 associated with each of the pinions. Furthermore, the requirements of the device regarding the foundation or bulk are small.

The device 110 of FIG. 2 in particular has the advantage of allowing a smaller vertical bulk than the other two embodiments, by securing the pinion shaft 42 and the output shaft 160 without going through a coupling 72.

In general, the drive device as described above and the mills comprising such devices make it possible to obtain high drive powers with a much smaller vertical bulk than the high-power stirred mills known in the state of the art. Installation and maintenance thereof are thus made easier.

The invention claimed is:

1. A vertical stirred mill, comprising:
 a milling tool rotating relative to a milling vat along a first vertical axis, the milling tool being arranged in the milling vat; and
 a drive device comprising:
  a main housing fastened to the milling vat and arranged above the milling vat, the main housing comprising an axial stop able to guide a rotary element axially and limit a downward axial movement of said rotary element, a rotary plate being arranged bearing on the axial stop, the axial stop thus being able to react to axial forces exerted on said milling tool during operation of the vertical stirred mill;
  a motor; and
  said rotary element rotated by said motor, rotating, relative to said main housing, about the first axis, and fastened to an upper end of said milling tool, said rotary element comprising
   said rotary plate perpendicular to the first axis; and
   an output crown gear secured to a periphery of said rotary plate;
  a first drive pinion meshing with said output crown gear, the first drive pinion being rotatable about a vertical second axis;
  a first drive unit rotating said first drive pinion, the first drive unit comprising an output shaft rotatable about a third axis; and
  a first coupling device connecting said first drive pinion to said output shaft, such that the second and third axes are aligned, the first coupling device having at least one degree of freedom allowing a misalignment between the second and third axes during a rotation transmission from said output shaft to said first drive pinion.

2. The vertical stirred mill according to claim 1, wherein said axial stop is a hydrostatic axial bearing.

3. The vertical stirred mill according to claim 1, wherein said axial stop is a hydrodynamic axial bearing.

4. The vertical stirred mill according to claim 1, wherein said axial stop is a stop with rolling elements.

5. The vertical stirred mill according to claim 1, wherein said main housing further comprises a radial bearing guiding said rotary element radially and reacting to radial forces exerted on said milling tool.

6. The vertical stirred mill according to claim 1, wherein said rotary element further comprises a cylindrical part arranged along the first axis, an upper end of the cylindrical part secured to said rotary plate, and a lower end of the cylindrical part secured to said milling tool.

7. The vertical stirred mill according to claim 1, wherein said drive device further comprises a second drive pinion and a second drive unit, said second drive unit rotating said second drive pinion, said first and second drive pinions and said first and second drive units distributed angularly around the first axis.

8. The vertical stirred mill according to claim 1, wherein said milling tool is suspended from said rotary element such that a weight of said milling tool is completely reacted to by said rotary element.

\* \* \* \* \*